United States Patent [19]

Yajima

[11] Patent Number: 4,928,183

[45] Date of Patent: May 22, 1990

[54] MANUALLY SCANNING APPARATUS WITH STRAIGHTENING ROLLERS

[75] Inventor: Hiroshi Yajima, Hanenishi, Japan

[73] Assignee: Casio Computer Co., Ltd., Tokyo, Japan

[21] Appl. No.: 411,720

[22] Filed: Sep. 25, 1989

[30] Foreign Application Priority Data

Oct. 4, 1988 [JP] Japan .......................... 63-129546[U]

[51] Int. Cl.$^5$ ...................... H04N 1/04; H04N 1/23; G06K 9/22
[52] U.S. Cl. .................................. 358/296; 346/143; 358/473; 358/497; 382/59
[58] Field of Search ............. 346/76 PH, 143; 400/88; 358/296, 473, 474, 482, 483, 486, 488, 494, 497; 382/59

[56] References Cited

U.S. PATENT DOCUMENTS

| | | | |
|---|---|---|---|
| 3,767,020 | 10/1973 | Rowe | 346/143 |
| 4,523,235 | 6/1985 | Rajchman | 346/76 PH |
| 4,750,049 | 6/1988 | Murakami et al. | 346/76 PH |
| 4,785,357 | 11/1988 | Dreyfus | 358/473 |
| 4,851,896 | 7/1989 | Muranaga | 358/296 |
| 4,868,676 | 9/1989 | Matsuura | 358/296 |

FOREIGN PATENT DOCUMENTS

| | | | |
|---|---|---|---|
| A083369 | 6/1980 | Japan | 358/473 |
| A009164 | 1/1982 | Japan | 358/473 |

*Primary Examiner*—Bruce A. Reynolds
*Assistant Examiner*—Scott A. Rogers
*Attorney, Agent, or Firm*—Frishauf, Holtz, Goodman & Woodward

[57] ABSTRACT

A manually operable scanning structure employs a mechanism for straightening movement on a record or an image recorded medium. The mechanism comprises a pair of rollers, support members for rotatably supporting the rollers and swaying members for coupling the support members with a housing member. Each of swaying members is formed in a bifurcated shape and has a flexible neck portion which is capable of swaying the roller. The flexible neck portion is positioned to the rear of the roller in a moving direction of the housing. Therefore, the swaying member sways the roller in an opposite direction by a reaction according to an external thrust force urged to the housing member.

7 Claims, 5 Drawing Sheets

MANUALLY SCANNING APPARATUS WITH STRAIGHTENING ROLLERS

BACKGROUND OF THE INVENTION

1. Field of the Invention

This invention relates to a manually operable scanning apparatus adapted to an apparatus such as a printer, an image reader or a printer with an image sensor.

2. Description of the Related Art

For example, a handy-type copying apparatus comprising printing means and image reading means has recently been developed and manufactured as a manual scanning apparatus. In this type of copying apparatus, while the body of the apparatus is manually operated, wheels disposed at a lower region of the apparatus run over a subject copy, and image reading means reads images on the subject copy sequentially. The read images are sequentially printed on a recording medium by printing means.

When an apparatus K of this type is operated, for example, by the right hand h, as shown in FIG. 9, an external force acting in the left direction is exerted on the apparatus K. Consequently, the apparatus K is not run in a straight direction, but is deviated in the left direction (direction Y). The deviated movement of apparatus K causes an image reading device disposed in the apparatus K to read images on a subject copy p as if they were distorted.

In addition, when the read images are printed on a recording medium by a printing device, printed characters or letters are blurred, and the density of ink is varied. In a worst case, an ink tape is entangled in an ink-tape take-up mechanism, causing a malfunction in the apparatus.

SUMMARY OF THE INVENTION

The object of the present invention relates to a manually operable scanning apparatus, wherein the degree of deviation from a normal straight direction of movement of the scanning apparatus is reduced as much as possible, and the normal straight direction can be maintained easily.

According to the present invention, a manually operable scanning apparatus comprises:
  housing means for being subjected to manual movement on a subject copy and having an opening at the bottom thereof;
  printing means disposed in the housing means for printing on a recording medium in accordance with the movement of said housing means through the opening;
  roller means disposed in the housing means and partly struck downward from the housing means; and
  movement straightening means for rotatably coupling said roller means with the housing means and for straightening the movement of the housing means against an external thrust force urged to the housing means.

DETAILED DESCRIPTION OF THE PREFERRED EMBODIMENTS

A first embodiment of the present invention as applied to a handy copying machine will be described with reference to FIGS. 1 to 5.

Figure 1:
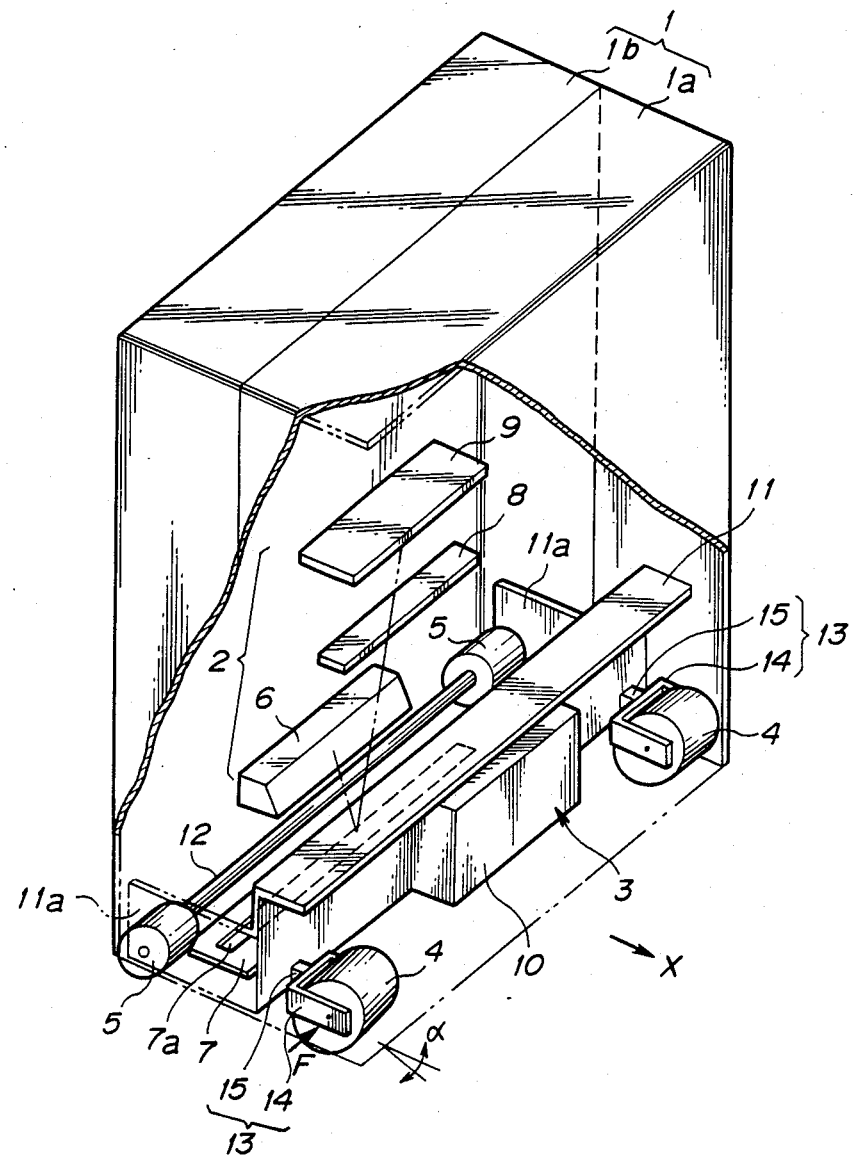
FIG. 1 is a partially exploded perspective view showing an internal structure of a handy copying apparatus having a manually operable scanning apparatus according to the present invention.
Figure 2:
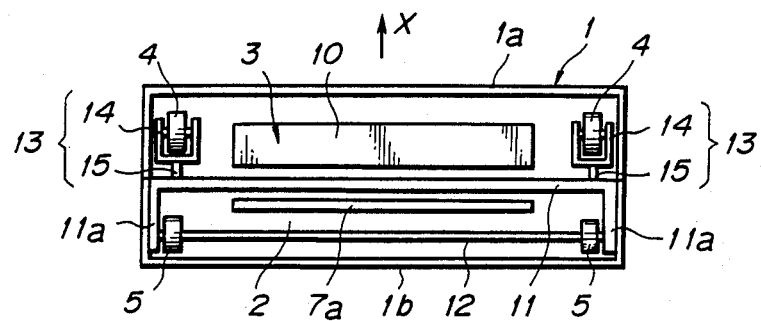
FIG. 2 is a plan view of the apparatus in FIG. 1, as viewed from the bottom of the apparatus.

FIGS. 1 and 2 show the handy copying machine.

The copying machine is manually moved over a subject copy or a recording medium in the direction of arrow X (hereinafter, referred to as "moving direction X"), thereby reading and printing images. An image read section 2 and a print section 3 are arranged within a housing 1. Two pairs of wheels 4 and 5 are arranged at a lower part of the housing 1. The housing 1 comprises a front casing 1a and a rear casing 1b. The bottom of the housing 1 is opened.

The image read section 2 comprises a light source 6, a light shield plate 7, a light collecting lens 8, and an image sensor 9 such as a CCD (charge-coupled device). The image read section 2 is arranged in the rear casing 1b of housing 1. The light source 6 radiates a beam on an image surface of a subject copy. The light source 6 is composed of a number of light-emitting diodes and is arranged in a lower part of the rear casing 1b. The light shield plate 7 limits the range of the beam radiated from the light source 6. The light shield plate 7 is made of a thin-plate and has a slit 7a which is formed in a middle portion of the light shield plate 7. The light shield plate 7 is arranged at a bottom portion of the rear casing 1b with longitudinal sides in a direction perpendicular to the moving (scanning) direction X. The light collecting lens 8, arranged above the light source 6, gathers light reflected from the recording medium onto the image sensor 9. The image sensor 9 receives the light gathered by the light collecting lens 8, and converts the received light into an electric signal or an image signal. As is generally known, the image sensor 9 is composed of a large number of CCDs. The image sensor 9 is arranged above the light collecting lens 8.

The print section 3 sequentially prints images read by the image read section 2 on the recording medium. The print section 3 comprises a printing head 10 and an ink ribbon (not shown). The print section 3 is arranged at a lower part of the front casing 1a. A base frame 11 is fixed in the front casing 1a. The printing head 10 is mounted on the base frame 11. As the printing head 10, for example, a thermal head wherein a number of resistance elements are arranged is employed. In this case, the ink ribbon runs below the printing head 10. The ink ribbon is stored in an ink ribbon cassette, and the ink ribbon is taken up in accordance with the movement of the copying machine.

The wheels 4 and 5 arranged at the lower part of housing 1 roll over the subject copy or the recording medium in accordance with the movement of the copying machine. The wheels 5 arranged on the rear casing 1b side are rotatably attached between mounting sections 11a of the base frame 11. The wheels 4 arranged on the front casing 1a side are rotatably held between swaying mechanisms 13 and are attached to the base frame 11. Each of the swaying mechanisms 13 comprises integrally a two-pronged holding portion 14 and an elastic thin neck 15. Each wheel 4 is rotatably journaled in the holding portion 14. The wheel 4 is coupled to the base frame 11 via the neck 15. While the copying machine is manually moved in the moving direction X, an external force F acting in a direction perpendicular to the moving direction X of the copying machine may be exerted on the copying machine. In response to the external force F acting on the copying machine, the swaying mechanism 13 produces a repulsion force in a direction opposite to the direction of the external force F, thereby keeping the direction of the wheels 4 in parallel to the scanning direction or the moving direction X of the machine.

The operation of the above copying machine will now be described with reference to FIGS. 3 to 6.

Figure 3:
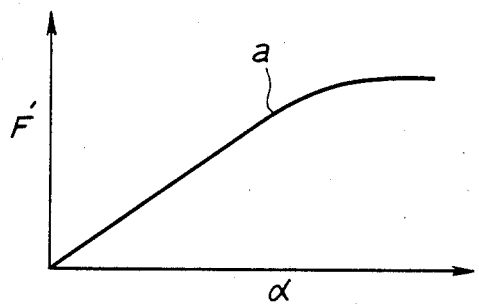
FIG. 3 shows a relationship between a reaction force F' to an external force exerted in the direction perpendicular to the scanning direction and a deviation angle $\alpha$ of a wheel.

FIG. 3 shows a relationship between a deviation angle $\alpha$ of the wheel 4 and a thrust force F' acting in the wheel 4 (the strength of force F' is equal to an external force F applied in a direction perpendicular to the scanning direction but the direction of action of force F' is opposite to that of action of the external force F). When the deviation angle $\alpha$ is small, the thrust force F' increases in proportion to the deviation angle $\alpha$. When the value of the deviation angle $\alpha$ exceeds a predetermined value, the thrust force F' reaches a critical value. Namely, when the value of the deviation angle $\alpha$ is within a predetermined range, the deviation angle of the wheel 4 is proportional to the external force F acting in a direction perpendicular to the moving direction X or the scanning direction).

Figure 4:
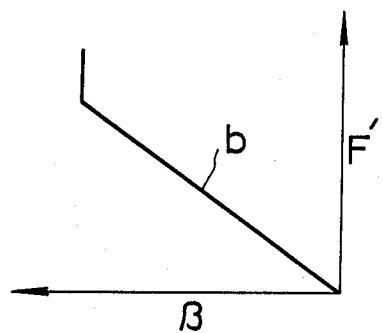
FIG. 4 shows a relationship between a reaction force F' to an external force exerted in the direction perpendicular to the scanning direction and a displacement angle $\beta$.
Figure 6:
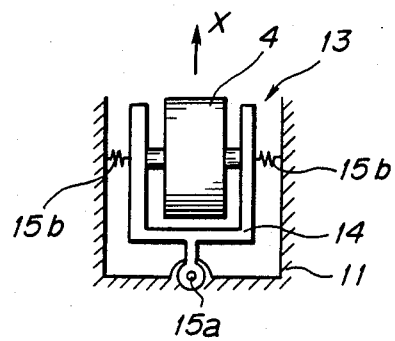
FIG. 6 illustrates a principle of a swaying mechanism shown in FIG. 1.

FIG. 4 shows a relationship between the thrust force F' and a displacement angle $\beta$ of the swaying mechanism 13. As shown in FIG. 4, the increase in thrust force F' increases the displacement angle $\beta$ of the swaying mechanism proportionally. Of course, when the elasticity of the swaying mechanism 13 exceeds an elastic limit, the displacement angle $\beta$ becomes constant. FIG. 6 illustrates the principle of the swaying mechanism 13. The swaying mechanism 13 comprises the holding portion 14 for rotatably holding the wheel 4, a pin 15a for rotatably supporting the holding portion 14, and coil springs 15b arranged between the base frame 11 and side surfaces of the holding portion 14. In the swaying mechanism 13, the coil springs 15b can provide the displacement angle $\beta$, in proportion to the thrust force F', to the holding portion 14 or the wheel 4. In other words, the coil springs 15b can provide the displacement angle $\beta$, proportional to the thrust force F', to the wheel 4. It is obvious that, if the pin 15a for rotatably supporting the holding portion 14 is arranged behind the wheel 4 in the scanning direction X, the displacement angle $\beta$ of the swaying mechanism 13 cancels the deviation angle of the wheel 4.

Figure 5:
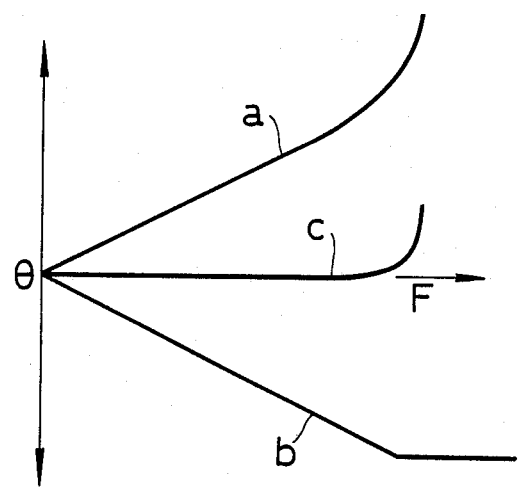
FIG. 5 illustrates a principle of a scanning apparatus of the present invention, which is based on FIGS. 3 and 4.

Thus, as shown in FIG. 5, if the absolute values of a deviation angle/thrust force characteristic curve a and a thrust force/deviation angle characteristic curve b are made equal, the deviation angle $\alpha$ and the displacement angle $\beta$ are canceled with each other, the copying machine is moved linearly, as indicated by a straight movement characteristic c.

Referring back to FIGS. 1 and 2, the neck 15 of swaying mechanism 13 has the functions of both pin 15a and coil springs 15b shown in FIG. 6. If the external force F is exerted to the machine in the direction perpendicular to the direction of movement, the displacement angle $\beta$ equal to the deviation angle $\alpha$ is produced.

Figure 7:
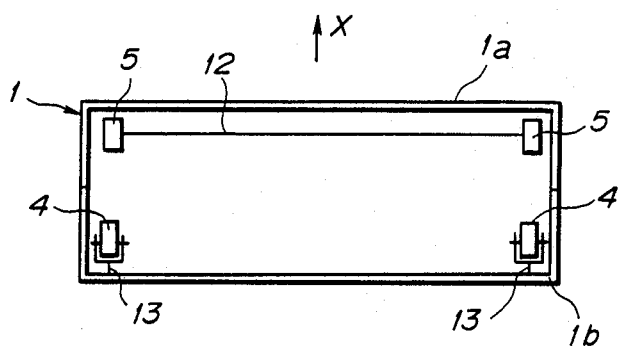
FIGS. 7 and 8 are bottom views of scanning apparatuses according to other embodiments of the present invention.

In the embodiment shown in FIGS. 1 and 2, the swaying mechanism 13 is mounted on the base frame 11. However, the swaying mechanism 13 may be mounted on the housing 1. In an embodiment shown in FIG. 7, the swaying mechanism 13 is mounted on the rear casing 1b. In this case, the wheels 5, which are not swingably arranged, are disposed on the front casing 1a side. If it is supposed that the wheels 4 are arranged within housing 1, the necks 15 are inevitably arranged on the rear casing 1b side. This condition coincides with the condition that the supporting members for wheels 4 are located behind wheels 4 in the moving direction X. Thus, in the embodiment shown in FIG. 6, the swaying mechanism 13 can be mounted in the same manner as in the embodiment of FIGS. 1 and 2 wherein the swaying mechanism 13 is mounted on the base frame 11.

However, the swaying mechanism 13 cannot be provided on the front casing 1a, unless it is modified. If the wheels 4 are to be arranged in the housing 1, the necks for connecting wheels 4 and front casing 1a would be located in front of wheels 4 in the moving direction X.

Figure 8:
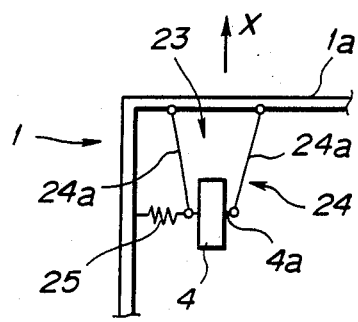
Figure 9:
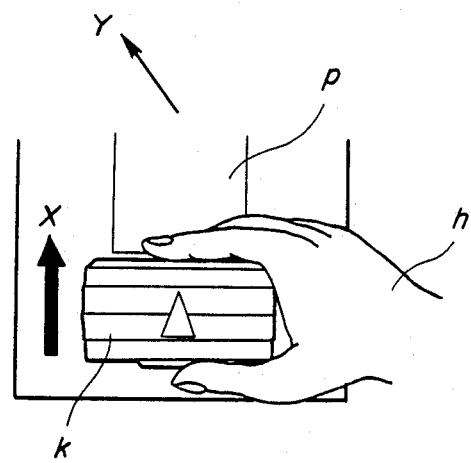
FIG. 9 shows a conventional copying machine.

FIG. 8 shows an embodiment in which the swaying mechanism is arranged on the front casing 1a side. A swaying mechanism 23 comprises a wheel 4, a support shaft 4a for rotatably supporting the wheel 4, a link mechanism 24 swingably connected to the support shaft 4a, and a coil spring 25 for providing a reaction force F' to the wheel 4 in proportion to an external force F. The link mechanism 24 is composed of a pair of flexible link members 24a for connecting end portions of the support shaft 4a to the front casing 1a. The link members 24a fix the wheel 4 to the front casing 1a such that the distance between those end portions of the link members 24a, which are connected to the front casing 1a, is larger than the distance between those end portions of the link members 24a, which are connected to the support shaft 4a. The center of swinging movement of the link mechanism 24 is present at a point representing the intersection of imaginary lines extended along both of the axes of the link members 24a. It is clear that the center of swinging movement is located behind the wheel 4a in the moving direction X. When an external force in a direction perpendicular to the direction X is exerted on the swaying mechanism 23, the coil spring 25 cancels the external force. In other words, when the external force is exerted to the left, the coil spring 25 is compressed, and a repulsion force is produced. When the external force is exerted to the right, the coil spring 25 is pulled, and a contraction force is produced. Consequently, the wheel 4 is always set in the moving direction X of the machine, and the machine is prevented from deviating. The machine can be moved in the direction X constantly. Thus, as in the above embodiment, the machine can perform the reading and printing with high operability.

The present invention is widely applicable not only to the handy copying machine, but also to a hand scanner for reading an image, or manual scanning devices for printing internally stored information or information supplied from an external device such as a word processor.

What is claimed is:

1. A manually operable scanning apparatus comprising:

housing means for being subjected to a manual movement on a recording medium and having an opening at the bottom thereof;

printing means disposed in said housing means for printing on said recording medium in accordance with the movement of said housing means through said opening;

roller means disposed in said housing means, a part of said roller means extending downward and out of said housing means; and movement straightening means for rotatably coupling said roller means with said housing means and for straightening the movement of said housing means against an external thrust force urged to said housing means.

2. The manually operable scanning apparatus according to claim 1, wherein said straightening means comprises support means for rotatably supporting said roller means and swaying means for swaying said support means by a reaction of said external thrust force; said swaying means being positioned rearwardly of said roller means in a moving direction of said housing means.

3. The manually operable scanning apparatus according to claim 2, wherein said housing means includes a front casing and a rear casing, and said swaying means is mounted on said rear casing.

4. The manually operable scanning apparatus according to claim 3, wherein said housing means includes a front casing, a rear casing and a base frame interposed between said front and rear casings, and said swaying means is coupled to said base frame.

5. The manually operable scanning apparatus according to claim 2, wherein said housing means includes a front casing and a rear casing, and said swaying means is mounted on said front casing.

6. The manually operable scanning apparatus according to claim 5, wherein said swaying means comprises link means for coupling said support means with said front casing so as to shorten a span between coupling portions to said support means, and bias means for biasing said link means in a thrust direction.

7. A manually operable scanning apparatus comprising:

housing means for being subjected to a manual moving on an image recorded paper and having an opening at a bottom thereof, image reading means disposed in said housing means for reading an image recorded on said paper, according to the moving of said housing means through said opening, roller means disposed in said housing means, a part of said roller means extending downward and out of said housing means, and moving straightening means for rotatably coupling said roller means with said housing means and for straightening the moving of said housing means against an external thrust force urged to said housing means.

* * * * *